United States Patent Office 3,472,798
Patented Oct. 14, 1969

3,472,798
PROCESS OF PREPARING STABILIZED SUSPENSION OF POLYMETHYLMETHACRYLATE MICROSPHERES IN POLYGLYCOL-BASED POLYURETHANE ELASTOMERS AND RESULTANT COMPOSITIONS
Lehi L. Pitchforth, Jr., Kalama, Wash., and James A. Struthers, Midland, Mich., assignors to The Dow Chemical Company, Midland, Mich., a corporation of Delaware
No Drawing. Filed July 21, 1965, Ser. No. 474,211
Int. Cl. C08g 41/04, 22/14
U.S. Cl. 260—2.5                         10 Claims

ABSTRACT OF THE DISCLOSURE

The disclosure described herein involves a polyurethane composition, and a process for producing such a polyurethane, having expanded polymethylmethacrylate microspheres therein. A polyvinyl chloride dispersion resin is used to stabilize the suspension of such microspheres in the polyglycol used in preparing the polyurethane elastomer. These microspheres are used as a filler in the elastomer. The stability of the suspension is effected by the proportions of the various components used, namely 5–50% polyvinyl chloride resin, 50–95% of polyol of a specified type and 0.5–6 parts by weight, per 100 parts of combined weights of the two aforenamed components, of polymethylmethacrylate microspheres of specified dimension and bulk density.

---

This invention relates to a polyurethane elastomer composition having expanded polymethylmethacrylate-neopentane microspheres therein. More specifically, it refers to the stabilization and use of such microspheres as a filler in polyglycol-based polyurethane elastomers. Moreover, it relates to a process of stabilizing suspension of such microspheres in the reaction mass used to prepare the polyurethane elastomer. Still more specifically, it relates to a process for the stabilization of such microwould be used in the preparation of the polyurethane resin.

In view of the high cost of polyurethane resins, it would be desirable to be able to use such material in smaller amounts without sacrifice of the advantageous properties of such material. One method of affecting such results would be to use polyurethane in cellular form so as to decrease the density.

In addition to lowering cost, such cellular polyurethane compositions are of interest in aircraft and missile applications where weight is an important factor. Various other uses such as in sewer tile gasketing are also important. Such cellular compositions having decreased density can be prepared by the suspension of hollow microspheres in the polyurethane. However, since the microspheres themselves are of such low density, they tend to rise to the surface when suspended in a liquid such as would be used in the preparation of the polyurethane resin.

A particularly desirable microsphere for this purpose would be expanded polymethylmethacrylate-neopentane microspheres which are microspheres prepared from polymethylmethacrylate using neopentane as the expanding agent. However, when such microspheres are used as a filler in the reagents used to prepare polyglycol-based polyurethane elastomers, this problem of the microspheres separating from the liquid reagent is encountered. For example, attempts to blend the expanded microspheres in the polyglycol used as one of the reagents in the preparation of the polyurethane elastomer is disappointing as separation occurs very rapidly.

In accordance with the present invention, it has now been found that the suspension of polymethylmethacrylate-neopentane microspheres can be stabilized in the polyglycol by the incorporation of polyvinyl chloride resin in an amount of 5–50% by weight of the polyglycol. In such manner, as high as 6% by weight of the microspheres can be incorporated in the polyglycol-polyvinyl chloride mixture. The advantages of the microspheres are apparent with as little as 0.5%. Preferred proportions are approximately 4% expanded microspheres using about 25.5% polyvinyl chloride (PVC) dispersion or plastisol resin. In view of the very low density of these microspheres, typically about 3 lbs. per cubic foot, it takes only a few percent to occupy a considerable volume of the composition. The proportions of polyglycol and isocyanate components are those generally used in polyurethane preparation. Moreover, except for the change in density, the various other properties of the elastomer are not considerably affected.

By such blending of the expanded microspheres and the polyvinyl chloride plastisol resin, it is possible to keep the microspheres dispersed for several days, thereby giving considerable storage life before use of the mixture in the preparation of the polyurethane resin.

The incorporation of the expanded microspheres has little effect on tensile strength, percent elongation and tear strength, and there is only a slight decrease in hardness. However, there is a significant increase in both the percent compression under load and the percent compression set.

The polymethylmethacrylate-neopentane microspheres that are advantageously used have diameters in the range of 1–500, preferably approximately 10–75 microns. These sizes have a density in the range of 0.5–3.0 pounds per cubic foot. Such microspheres can be prepared by various methods, such as shown in U.S. Patent 2,797,201 and Belgian Patent 641,711.

The polymethylmethacrylate-neopentane spheres are prepared by using the polymethylmethacrylate as the film forming material and the neopentane as the expanding agent. In addition to the polymethylmethacrylate, related materials can be used, such as phenol-formaldehyde and urea-formaldehyde resins. Likewise, in place of the neopentane, other expanding agents can be used, such as n-pentane, isopentane, neohexane, Freon 114 and Freon 12.

Microspheres of polymethylmethacrylate neopentane type can be prepared with average diameters of 1–500 microns, and even up to diameters of one-eighth of an inch. Generally, 10–75 micron diameters are preferred. The bulk density will vary according to the thickness of the skin of the microspheres. These dimensions will depend upon the droplet size used in producing the spheres and the concentration of the film-forming material and the latent gas material in the solution used to prepare these spheres when they are prepared according to the process of Patent 2,797,201. In these sizes, the bulk density is within the range of 0.01–3.

Polyurethanes of various types can be used in the practice of this invention. The various properties desired in such polyurethanes depend primarily on the polyglycols and the diisocyanates used, as well as the proportions and the method of preparation. In general, the type of polyurethane and the method of preparation are not critical in the practice of this invention, the variations in such materials and the method of preparation being determined according to the properties desired in the ultimate product.

The polyglycol can be of the various types generally used, such as the polyoxyalkylene glycols such as the polymers of ethylene glycol, propylene glycol, butylene glycol, dimethylol benzene, diethylol benzene, etc., for example, polyethylene glycol, polypropylene glycol, etc. Triols of these polyglycols can also be used when they are initiated by an alkanetriol such as trimethylolpropane, 1,2,6-hexanetriol, glycerine, etc. The polyester glycols can also be used, such as produced by the reaction of glycols and dibasic acids in such proportions that the terminal groups are hydroxy groups, such as, for example, those produced from the reaction of glycols, such as ethylene glycol, propylene glycol, butylene glycol, etc., with phthalic anhydride, maleic anhydride, succinic anhydride, etc. Other polyols of polyhydric materials containing reactive hydrogens can be used including: amines, castor oil, glycerine, trimethylol propane, 1,2,6-hexanetriol, pentaerythritol, sorbitol, sucrose, etc. Polyglycols preferably have a molecular weight of about 200–4,000 for the purpose of this invention and polytriols which may be used in combination with or in place of the polyglycols preferably have a molecular weight of about 135–3,000.

Particularly preferred in the preparation of the polyurethanes in the practice of this invention are polypropylene glycol diol and polypropylene glycol triol. Particularly suitable is a mixture of 90 parts by weight of polypropylene glycol diol having an OH content of about 2.84% and 10 parts by weight of polypropylene glycol triol having an OH content of 19.9%. Such materials are available commercially under the trademarks Voranol P-1200 and Voranol CP-260, respectively.

The various isocyanates generally suitable for preparing polyurethane resins can be used in the practice of this invention. The proportions are advantageously in the range of 0.9 to 1.2 NCO groups in the isocyanate component per OH group in the diol or triol component.

Typical isocyanates that can be used include: 2,4-tolylene diisocyanate, 2,6-tolylene diisocyanate, p-phenylene diisocyanate, 4,4′-diphenylmethane diisocyanate, 1,5-naphthylene diisocyanate, dibenzidene diisocyanate, benzidene diisocyanate, 4,4′-diphenyl diisocyanate, hexamethylene diisocyanate, tetramethylene diisocyanate, cyclohexylene diisocyanate, 4,4′-dicyclohexylmethane diisocyanate, and various prepolymers formed therefrom by reaction with glycols and polyglycols.

Especially suitable as the isocyanate component for the practice of this invention is an adduct of polypropylene glycol and toluene diisocyanate prepared as described below.

For a specified NCO content in the polyglycol diisocyanate adduct the following equation can be used:

$$\frac{N_2 - N_1}{48.28 - N_2} \times W = \text{parts toluene diisocyanate to add to } W \text{ parts polyglycol-diisocyanate adduct}$$

Where:
$N_2$ = final percent isocyanate (NCO) desired
$N_1$ = initial percent isocyanate present
$W$ = parts polyglycol-diisocyanate adduct to which toluene diisocyanate is added In carrying out the preparation of the adduct, all of the toluene diisocyanate (TDI) is placed in a reactor equipped with a cooling means to extract the heat of reaction, since the reaction is exothermic. An atmosphere of dry inert gas is maintained in the reactor. The TDI is heated to about 50° C. and the polyglycol is then fed into the reactor at a rate slow enough for the cooling means to remove the exothermic heat sufficiently to keep the reaction temperature below 90° F. After the addition of the polyglycol is completed, the reaction mass is heated an additional 2–3 hours at 50–70° C. The following proportions are typical for representative percentages of isocyanate:

| Approximate percent NCO | Polypropylene glycol (Voranol CP-260) (parts) | Toluene diisocyanate (parts) |
| --- | --- | --- |
| 27 | 30.8 | 100 |
| 30 | 24.2 | 100 |
| 34 | 18.5 | 100 |

The polyvinyl chloride dispersion resin is advantageously one having any intrinsic viscosity in the range of 0.8 to 1.27, preferably about 1.27 and having a particle size such that substantially all will pass through a 100 mesh screen (Tyler) and preferably all will pass through a 200 mesh screen.

As previously indicated, the amounts of PVC to be added are in the range of 5–50% by weight of the polyglycol, preferably about 25% depending on the amount of microsphere filler to be added.

In preparing the suspension of microspheres in the polyglycol-PVC mixture, the polyvinyl chloride dispersion resin is blended into the liquid polyglycol at temperatures up to about 50° C. until a smooth liquid or paste results having few if any discrete particles or agglomerates. The expanded microspheres are then added and blended in until thoroughly dispersed. The blending can be effected by simple handstirring with a spatula, or with a laboratory mixer or larger mixing equipment. While the mixtures can also be prepared by the addition of the microspheres first to the polyglycol, the above-mentioned order of addition is preferred.

A catalyst suitable for promoting the reaction between the polyglycol and the isocyanate material, such as lead octoate, lead naphthenate, dibutyltin dilaurate, stannous octoate, tin oleate, zinc oleate, zinc naphthenate, zinc propionate, zinc octoate, metal acetylacetonate, etc. is advantageously added in an amount up to 6% or more, preferably about 0.25–2% based on the polyglycol-isocyanate components. This polyglycol mixture is degassed under a reduced pressure of 10 mm. Hg or less for an appropriate time. This may be for several minutes or even hours depending on the particular elastomer being prepared. The degassing operation can be carried out at room temperature or at an elevated temperature below the melting point of the microsphere and the fusion point of the polyvinyl chloride resin.

To this degassed mixture is added the isocyanate component, such as toluene diisocyanate, a toluene diisocyanatepropylene glycol adduct, etc. The temperature is then held at 25°–70° C. for 15 minutes to 4 hours or until the material is fully cured.

The invention is best illustrated by the following examples. These examples are intended merely for illustrative purposes and are not intended in any way to limit the scope of the invention nor the manner in which the invention can be practiced. Unless specifically indicated otherwise, parts and percentages are given as parts and percentages by weight.

EXAMPLE I

A number of compositions are prepared according to the following procedure. The desired amount of polyglycol is added to a 400 ml. beaker and the appropriate amount of polymethylmethacrylate-neopentane microspheres is added and stirred carefully into the liquid with a spatula. The polyvinyl chloride plastisol resin is then blended in. The mixture is next deaerated at 2 mm. of Hg for 30 minutes. To this mixture is added the appropriate amount of catalyst and the stirring continued until uniformly distributed.

Into a 4 ml. beaker is added an appropriate amount of the above formulated polyglycol-filler catalyst mixture and an appropriate amount of dipropylene glycol-toluene diisocyanate adduct having an isocyanate content of 26.5% The reaction mass is thoroughly mixed with an air motor-driven agitator shaped so as to continuously scrape the bottom and sides of the beaker. Care is taken to prevent mixing of air into the reaction mass. After approximately 30 seconds of mixing, the sample is quickly poured into a centrifugal mold revolving at 900 r.p.m. and maintained at 50±5° C.

In the four experiments tabulated below in Table I, a mixture is prepared in each case of polypropylene glycol, polyvinyl chloride and microspheres plus catalyst to prepare component A, which in turn is shown in the lower part of the table as reacted with the diisocyanate component B.

The polypropylene glycol P1200 which is a diol has an equivalent weight of 598, has an average hydroxyl number of 93.4 and contains 2.84% hydroxy groups and 0.03% water. The polypropylene glycol CP700 which is a triol has an equivalent weight of 232 and has 7.37% hydroxy groups and 0.07% water. The polypropylene glycol CP260 which is a triol has an equivalent weight of 85, has an average hydroxyl number of 660, and contains 20% hydroxy group.

The preferred polyvinyl chloride is commercially available under the trademarks Vinnol P100–70 and Geon 121. The polymethylmethacrylate microspheres preferably have an average diameter of about 10–75 microns and have a density of about 3 pounds per cubic foot.

The properties of the intermediate component A and of the ultimate product are shown in Table I.

TABLE I.—POLYGLYCOL, PVC, MICROSPHERE, CATALYST (COMPONENT A)

| | Run 1 | Run 2 | Run 3 | Run 4 |
|---|---|---|---|---|
| Polypropylene glycol P1200,[1] gms | 150.0 | 51.0 | 42.0 | 42.0 |
| Polypropylene glycol CP700,[2] gms | 90.0 | 29.0 | 28.0 | 28.0 |
| Polyvinylchloride,[3] gms | 156.0 | 16.5 | 26.0 | 25.0 |
| Polymethyl methacrylate microspheres (av. dia.), gms | | 3.0 | 3.0 | 4.0 |
| Lead octoate (24% Pb), gms | 4.0 | 0.5 | 1.0 | 1.0 |
| Polyglycol equiv. weight | 627 | 476 | 524 | 524 |
| Density (gms./cc.) | 1.13 | 0.67 | 0.79 | 0.72 |
| Brookfield viscosity: | | | | |
| 3 r.p.m | 16,200 | 2,560 | 8,000 | 10,400 |
| 6 r.p.m | 10,400 | 2,420 | 5,800 | 7,300 |
| Component A, gms | 100.0 | 75.0 | 70.0 | 70.0 |
| Dipropylene glycol-toluene diisocyanate adduct (26.5% NCO), gms | 26.5 | 26.2 | 22.2 | 22.8 |
| Shore A hardness | 75 | 65 | 68 | 70 |
| Tensile strength, p.s.i | 805 | 496 | 617 | 620 |
| Percent elongation | 133 | 110 | 110 | 93 |
| Tear strength | 22.9 | 16.4 | 20.3 | 22.7 |
| Percent compression, U.L | 21.0 | 44.4 | 35.3 | 37.0 |
| Percent compression, set | 0.4 | 6.0 | 2.8 | 3.6 |
| Percent water absorption | 2.81 | 4.26 | 3.54 | 3.76 |
| Density, gms./cc | 1.15 | 0.78 | 0.88 | 0.82 |

[1] Available commercially under trademark "Voranol P1200."
[2] Available commercially under trademark "Voranol CP700."
[3] Available commercially under trademark "Vinnol P100/70."

EXAMPLE II

The procedure of Example I is repeated for three experiments for which the conditions and results are tabulated in Table II.

TABLE II.—POLYGLCOL, PVC, MICROSPHERE, CATALYST (COMPONENT A)

| | Run 5 | Run 6 | Run 7 |
|---|---|---|---|
| Polypropylene glycol CP260,[4] gms | 39.0 | 40.0 | 40.0 |
| Polypropylene glycol CP700,[2] gms | 26.0 | 30.0 | 30.0 |
| Polyvinylchloride,[3] gms | 31.0 | 25.5 | 25.5 |
| Polymethylmethacrylate microspheres (av. dia.), gms | 3.0 | 4.0 | 4.0 |
| Lead octoate (24% Pb), gms | 1.0 | 0.5 | 0.5 |
| Polyglycol equiv. weight | 565 | 510 | 510 |
| Density (gms./cc.) | 0.80 | 0.70 | 0.71 |
| Brookfield viscosity: | | | |
| 3 r.p.m | 14,800 | 6,800 | 8,200 |
| 6 r.p.m | 9,700 | 5,300 | 6,300 |
| Component A, gms | 80.0 | 70.0 | 70.0 |
| Dipropylene glycol-toluene diisocyanate adduct (26.5% NCO), gms | 23.5 | 22.8 | 22.8 |
| Shore A hardness | 73 | 70 | 70 |
| Tensile strength, p.s.i | 677 | 570 | 647 |
| Percent elongation | 100 | 98 | 100 |
| Tear strength | 22 | 22.2 | 21.3 |
| Percent compression, U.L | 33.8 | 40.5 | 40.7 |
| Percent compression, set | 3.0 | 5.3 | 4.8 |
| Percent water absorption | 3.31 | 3.66 | 3.62 |
| Density, gms./cc | 0.88 | 0.80 | 0.80 |

[2] Available commercially under trademark "Voranol CP700."
[3] Available commercially under trademark "Vinnol P100/70."
[4] Available commercially under trademark "Voranol CP 260."

EXAMPLE III

The procedure of Example I is repeated for three experiments except a different commercial brand of polyvinyl chloride is used and in Run 10 a different brand of polypropylene glycol triol. The conditions and results are tabulated in Table III.

TABLE III.—POLYGLYCOL, PVC, MICROSPHERE, CATALYST (COMPONENT A)

| | Run 8 | Run 9 | Run 10 |
|---|---|---|---|
| Polypropylene glycol P1200,[1] gms | 150.0 | 40.0 | 62.5 |
| Polypropylene glycol CP260,[4] gms | | | 7.5 |
| Polypropylene glycol CP700,[2] gms | 90.0 | 30.0 | |
| Polyvinylchloride,[5] gms | 158.0 | 25.5 | 25.5 |
| Polymethyl methacrylate microspheres (av. dia.), gms | | 4.0 | 4.0 |
| Lead octoate (24% Pb), gms | 2.0 | 0.5 | 0.5 |
| Polyglycol equiv. weight | 627 | 510 | 520 |
| Density (gms./cc.) | 1.13 | 0.72 | 0.72 |
| Brookfield viscosity: | | | |
| 3 r.p.m | 23,200 | 12,700 | 14,900 |
| 6 r.p.m | 15,100 | 8,900 | 10,300 |
| Component A, gms | 80.0 | 70.0 | 70.0 |
| Dipropylene glycol-toluene diisocyanate adduct (26.5% NCO), gms | 21.2 | 22.8 | 22.4 |
| Shore A hardness | 75 | 70 | 70 |
| Tensile strength, p.s.i | 762 | 607 | 636 |
| Percent elongation | 120 | 80 | 115 |
| Tear strength | 26.1 | 19.1 | 23.9 |
| Percent compression, U.L | 20.8 | 37.0 | 35.6 |
| Percent compression, set | 0.4 | 4.1 | 3.6 |
| Percent water absorption | 2.85 | 4.13 | 4.72 |
| Density, gms./cc | 1.156 | 0.81 | 0.80 |

[1] Available commercially under trademark "Voranol P1200."
[2] Available commercially under trademark "Voranol CP700."
[4] Available commercially under trademark "Voranol CP260."
[5] Available commercially under trademark "Geon 121."

EXAMPLE IV

The procedure of Example I is repeated with the conditions and results shown in Table IV.

TABLE IV.—POLYGLYCOL, PVC, MICROSPHERE, CATALYST (COMPONENT A)

| | Run 11 | Run 12 |
|---|---|---|
| Polypropylene glycol P1200,[1] gms | 135.0 | 126.0 |
| Polypropylene glycol CP260,[4] gms | 15.0 | 14.0 |
| Polyvinylchloride V R-53,[6] gms | 56.3 | |
| Polyvinylchloride P100/70,[7] gms | | 55.0 |
| Polymethyl methacrylate microspheres (av. dia.), gms | 2.5 | 4.0 |
| Polyglycol equiv. weight | 523 | 535 |
| Density (gms./cc.) | 0.86 | 0.75 |
| Brookfield viscosity: | | |
| 3 r.p.m | 8,280 | 8,440 |
| 6 r.p.m | 5,740 | 5,900 |
| Component A, gms | 90.0 | 80.0 |
| Polypropylene glycol CP260-toluene diisocyanate adduct (26.8% NCO), gms | 28.0 | 25.2 |
| Shore A hardness, p.s.i | 75 | 75 |
| Tensile strength | 660 | 659 |
| Percent elongation | 110 | 100 |
| Tear strength | 12.0 | 10.0 |
| Percent compression, U.L | 28.0 | 31.0 |
| Percent compression, set | 1.2 | 2.2 |
| Density (gms./cc.) | 0.94 | 0.84 |

[1] Available commercially under trademark "Voranol P1200."
[4] Available commercially under trademark "Voranol CP260."
[6] Available commercially under trademark "Marvinol V R-53."
[7] Available commercially under trademark "Vinnol P100/70."

In the various examples above, lead octoate is shown incorporated in the glycol-PVC suspension along with the microspheres. This is a convenient method for incorporating the catalyst in the reaction mass. In cases where no catalyst is used, or it is preferred to add the catalyst in another manner, the suspension will not contain such a catalyst. Generally it is preferred to use lead octoate or other catalyst in an amount of about 0.5–4% by weight.

The proportions of glycol and PVC are reported above as 5–50% by weight of PVC and 50–95% of polyglycol. While the amount of microspheres has also been reported above in percentage, it is sometimes preferred to report the amount of microspheres in parts per weight per 100 parts by weight of the PVC-polyglycol mixture. This is roughly about the same numerical value, namely 0.5–6 parts by weight of microspheres per 100 parts of PVC-polyglycol mixture. This suspension is combined and reacted with the isocyanate for producing the polyurethane resin in accordance with the normal proportions of isocyanate and polyglycol and reaction conditions normally used for this purpose.

As indicated above, an important use for the composition of this invention is in the preparation of elastomeric seals cast in place on vitrified clay sewer pipe. Other uses include spraying compositions for application as coating compositions on floors and roofs, coatings on horse race tracks, wire incapsulation, sealants, joints for concrete highways, gromets, gaskets, etc.

A particularly appropriate design of joints for sewer pipes in which the composition of this invention can be used is disclosed in Canadian Patent 668,250 issued Aug. 6, 1963. The elastomeric properties of these compositions make them particularly appropriate for this purpose.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A process for preparing a suspension of polymethylmethacrylate microspheres in a polyglycol suitable for reaction with an isocyanate in the preparation of polyurethane resins comprising the step of blending a mixture of:
   (a) 5–50% by weight of finely divided polyvinyl chloride resin,
   (b) 50–95% by weight of a polyol selected from the class consisting of polyglycol diols having a molecular weight in the range of 200–4000 and polyglycol triols having a molecular weight in the range of about 135–3000, and
   (c) 0.5–6 parts by weight per 100 parts of combined weight of components (a) and (b), of polymethylmethacrylate microspheres having diameters in the range of 1–500 microns and a bulk density in the range of 0.5–3 pounds per cubic foot, said blending being continued until the said components (a), (b) and (c) are substantially uniformly distributed throughout the resultant mixture.

2. The process of claim 2 in which said polyol is a mixture of 90% by weight of polypropylene glycol diol having a molecular weight of about 600 and 10% by weight of a polypropylene glycol triol.

3. A process of claim 2 in which said microspheres have a bulk density of about 3 pounds per cubic foot.

4. A process of claim 1 in which said microspheres have a bulk density of about 3 pounds per cubic foot.

5. A suspension of polymethylmethacrylate microspheres in a polyglycol suitable for reaction with a polyisocyanate for the preparation of polyurethane resins comprising:
   (a) 5–50% by weight of polyvinyl chloride resin,
   (b) 50–95% by weight of polyol selected from the class consisting of polyglycol diols having a molecular weight in the range of 200–4000 and polyglycol triols having a molecular weight in the range of about 135–3000, and
   (c) 0.5–6 parts by weight per 100 parts of combined weight of components (a) and (b), of polymethylmethacrylate microspheres having diameters in the range of 1–500 microns and a bulk density in the range of 0.5–3 pounds per cubic foot.

6. A suspension of claim 5 in which said polyol is a mixture of 90% by weight of polypropylene glycol diol having a molecular weight of about 600 and 10% by weight of polypropylene glycol triol.

7. A suspension of claim 5 in which said microspheres have a bulk density of about 3 pounds per cubic foot.

8. A process for preparing a polyurethane resin composition comprising the steps of reacting a polyisocyanate with the polyglycol suspension of claim 5.

9. The process of claim 8 in which said polyol is a mixture of 90% by weight of polypropylene glycol diol having a molecular weight of about 600 and 10% by weight of a polypropylene glycol triol.

10. The process of claim 8 in which said microspheres have a bulk density of about 3 pounds per cubic foot.

References Cited

UNITED STATES PATENTS

| | | |
|---|---|---|
| 2,797,201 | 6/1957 | Veatch et al. |
| 2,977,330 | 3/1961 | Brower. |
| 3,201,136 | 8/1965 | Harrison et al. |
| 3,238,156 | 3/1966 | Kohrn. |

FOREIGN PATENTS

| | | |
|---|---|---|
| 571,368 | 2/1959 | Canada. |
| 571,519 | 3/1959 | Canada. |

SAMUEL H. BLECH, Primary Examiner

J. T. GOOLKASIAN, Assistant Examiner

U.S. Cl. X.R.

117—161; 260—859; 277—198

UNITED STATES PATENT OFFICE
CERTIFICATE OF CORRECTION

Patent No. 3,472,798                              October 14, 1969

Lehi L. Pitchforth, Jr., et al.

It is certified that error appears in the above identified patent and that said Letters Patent are hereby corrected as shown below:

Column 1, lines 41 and 42, cancel "would be used in the preparation of the polyurethane resin." and insert -- spheres suspended in the polyglycol by the use of a polyvinyl chloride dispersion resin. --.

Signed and sealed this 17th day of February 1970.

(SEAL)
Attest:

Edward M. Fletcher, Jr.                      WILLIAM E. SCHUYLER, JR.
Attesting Officer                               Commissioner of Patents